(12) United States Patent
Delbreil et al.

(10) Patent No.: US 7,398,107 B2
(45) Date of Patent: Jul. 8, 2008

(54) FIXED TRANSMITTING STATION WITH ELECTROMAGNETIC FIELD PROBE

(75) Inventors: Pierre Delbreil, Boulogene Billancourt (FR); Christophe Grangeat, Sevres (FR); Marc Edimo, Les Ulis (FR)

(73) Assignee: Alcatel, Paris (FR)

( * ) Notice: Subject to any disclaimer, the term of this patent is extended or adjusted under 35 U.S.C. 154(b) by 719 days.

(21) Appl. No.: 10/727,594

(22) Filed: Dec. 5, 2003

(65) Prior Publication Data
US 2004/0121807 A1 Jun. 24, 2004

(30) Foreign Application Priority Data
Dec. 20, 2002 (EP) ................................. 02360378

(51) Int. Cl.
*H04B 1/38* (2006.01)
*H04M 1/00* (2006.01)

(52) U.S. Cl. ................... 455/561; 455/67.11; 455/126; 455/562.1

(58) Field of Classification Search ................. 455/403, 455/561, 562.1, 67.11, 9, 11.1, 507, 19, 66.1, 455/82, 414.3, 414.1, 452.2, 41.1, 101, 69, 455/126, 67.16, 13.3, 108, 114.1, 114.2, 455/115.1; 709/224; 343/841, 703; 324/247
See application file for complete search history.

(56) References Cited

U.S. PATENT DOCUMENTS

| | | | |
|---|---|---|---|
| 6,411,824 B1* | 6/2002 | Eidson | 455/561 |
| 6,970,679 B2* | 11/2005 | Blatz et al. | 455/41.1 |
| 7,020,701 B1* | 3/2006 | Gelvin et al. | 370/390 |
| 2002/0150228 A1* | 10/2002 | Umeda et al. | 379/220.01 |
| 2004/0129890 A1* | 7/2004 | Berman et al. | 250/380 |

OTHER PUBLICATIONS

C. Olivier, et al.: "Measuring techniques for the exposure assessment around base stations for mobile communications", Proceedings of the 9th URSI Forum 2001, Dec. 13, 2001, Louvaine-la-Neuve, Blgium, p. 5.
C. Olivier, et al.: "A practical method for compliance testing of base stations for mobile communications with exposure limits", Proceedings of the 2001 IEEE AP-S International Symposium and USNC/URSI National Radio Science Meeting, vol. 2, Jul. 8-13, 2001, Boston, Massachusetts, USA, pp. 64-67.
C Olivier, et al.: :Measurements of exposure to electromagnetic radiation around GSM base stations in Belium: a base for a practical measuring procedure, Abstract book of the BEMS Twenty-Third Annual Meeting in cooperation with the European Bioelectromagnetics Association, Jun. 10-14, 2001, St. Paul, Minnesota, USA, pp. 102-104.
W. Joseph, et al.: "Calibration of filed probes and study of the disturbance on the evaluation of electromagnetic fields", Proceedings of the 9th URSI Forum 2001, Dec. 13, 2001, Louvain-la-Neuve, Belgium, p. 48.

* cited by examiner

*Primary Examiner*—John J. Lee
(74) *Attorney, Agent, or Firm*—Sughrue Mion, PLLC

(57) ABSTRACT

The present invention relates to a fixed transmitting station of a wireless telecommunication system comprising:
    antenna means (104, 106, 108)
    measurement means (110, 112) for electromagnetic field measurements of an electromagnetic environment of the antenna means,
    means (112, 118, 116, 120, 122) for transmitting data being indicative of a measurement result to a central control unit (124).

17 Claims, 3 Drawing Sheets

FIXED TRANSMITTING STATION WITH ELECTROMAGNETIC FIELD PROBE

The invention is based on a priority application EP 02 360 378.0 which is hereby incorporated by reference.

FIELD OF THE INVENTION

The present invention relates to the field of wireless telecommunication systems, and more particularly without limitation to the measurement of electromagnetic fields around fixed transmitting stations, such as base station antennas.

BACKGROUND AND PRIOR ART

According to national and international regulations (e.g. EC recommendation 1999/519/EC and RTTE Directive 1999/5/EC), when a base station (BTS) is put into service, it is mandatory to comply with the essential safety requirements, in particular those related to human exposure to RF emissions. In-situ compliance assessment depends on the EM environment (EME). It is impacted by reflection and diffraction from nearby objects and by emissions from other sources (e.g. broadcast, FM . . . ) or from other mobile networks (GSM or UMTS). This problem is particularly important in a context of site sharing.

To date, operators or regulatory agencies have to make in-situ measurements to verify a posteriori that the EM environment has not changed since the base station has been put into service.

Usually a measurement equipment consisting of an electromagnetic field probe and a measurement device (e.g. a spectrum analyser or a voltmeter) which is controlled by a laptop is used for performing the electromagnetic field survey. By means of such a measurement, an accurate verification can be performed that the applicable electromagnetic exposure limits, which have been issued by the competent authority have been met. To date, exposure limits for the general public are defined by the European recommendation 1999/519/EC.

The methods for compliance assessment are defined by CENELEC (European Committee for electrotechnical standardisation, documents from TC 106X WG1) under the mandate M305 of the European Commission. Compliance assessment of a base station is performed according to the standards EN50383 to EN50385, when the equipment is put on the market. Compliance assessment when the base station is put into service is performed according to the draft European standards prEN50400 and prEN50401. European standards for market enforcement and in-situ measurements are currently being drafted. A large number of protocols have been established on a national basis (for example in France by Agence Nationale des fréquences 'in situ measurement protocol', edition 2001) or on an international basis (for example CEPT 02 04 "measuring non-ionizing radiation (9 kHz-300 GHz)" from the Electronic Communications Committee (ECC) within the European Conference of Postal and Telecommunications Administrations (CEPT)). In particular, those standards apply when a base station of a cellular telecommunication system is installed.

However, these norms also have to be met during operation of the base station, especially when the electromagnetic environment has changed. For this purpose, electromagnetic field exposure surveys are performed by the operators or the regulatory agencies. The disadvantage of this procedure is that monitoring of EME changes with a posteriori in-situ measurements requires a lot of manpower (cf. C. Olivier, L. Martens, "Measuring techniques for the exposure assessment around base stations for mobile communications", Proceedings of the 9th URSI Forum 2001, 13 Dec. 2001, Louvain-la-Neuve, Belgium, pp. 5. C.; Olivier, L. Martens, "A practical method for compliance testing of base stations for mobile communications with exposure limits", Proceedings of the 2001 IEEE AP-S International Symposium and USNC/URSI National Radio Science Meeting, Vol. 2, 8-13 Jul. 2001, Boston, Mass., USA, pp. 64-67; C. Olivier, L. Martens, "Measurements of exposure to electromagnetic radiation around GSM base stations in Belgium: a base for a practical measuring procedure", Abstract book of the BEMS Twenty-Third Annual Meeting in cooperation with the European Bioelectromagnetics Association, 10-14 Jun. 2001, St. Paul, Minn., USA, pp. 102-104; W. Joseph, L. Martens, "Calibration of field probes and study of the disturbance on the evaluation of electromagnetic fields", Proceedings of the 9th URSI Forum 2001, 13 Dec. 2001, Louvain-la-Neuve, Belgium, pp. 48.).

The present invention therefore aims to provide an improved method of monitoring a fixed transmitting station.

SUMMARY OF THE INVENTION

The present invention provides a method of monitoring implemented on a fixed transmitting station of a wireless telecommunication system. For example, the fixed transmitting station can be a base station (BTS) of a GSM cellular mobile telecommunication system or it can be a node-B of a UMTS system. Such a fixed transmitting station has an antenna for sending and receiving of electromagnetic signals. The in-situ compliance assessment in the vicinity of the antenna depends on electromagnetic fields emitted by the antennas itself as well as the electromagnetic environment of the antenna. The electromagnetic environment may vary over time when additional systems are installed which emit electromagnetic fields.

The present invention is particularly advantageous in that any relevant change in the electromagnetic environment is detected automatically without manual interaction and is reported to a central control unit. This enables an operator to ensure at all times that the applicable regulations are met.

In accordance with a preferred embodiment of the invention one or more electromagnetic field probes are fixed to the antenna for performing the electromagnetic field measurements. For example, a measurement probe can be mounted on top of the antenna and/or on the rear panel of the antenna and/or on the shelter of an outdoor base station and/or at any place in the vicinity of the main lobe of the emitting antenna.

In accordance with a further preferred embodiment of the invention the electromagnetic field probes are coupled to a measurement device for receiving of the measurement signals from the probes. The measurement device provides measurement data which is transmitted to a central control unit and processed. On the basis of this measurement data the fixed transmitting station can be centrally monitored.

In accordance with further preferred embodiment of the invention the measurement data provided by the measurement device is imputed into the base station of the fixed transmitting station via an appropriate interface. From there the measurement data are transmitted to an operations and maintenance centre. In the operations and maintenance centre the measurement data is processed and monitored. Alternatively some or all of the processing is done on the level of the base station and only the data processing results are transmitted to the operations and maintenance centre. The same applies analogously to a UMTS-type network where a node-B is used instead of a base station.

In accordance with a further preferred embodiment of the invention the electromagnetic field measurements are not only used for the purposes of monitoring of the fixed transmitting station but also for controlling of radio network parameters of the wireless communication system. For example when a drift of the EME parameters is detected one or more of the radio link parameters are adapted correspondingly in order to ensure that despite the drift of EME parameters all of the applicable regulations are still met.

BRIEF DESCRIPTION OF THE DRAWINGS

In the following preferred embodiments of the invention will be described in greater detail by making reference to the drawings in which.

DETAILED DESCRIPTION

Figure 1:
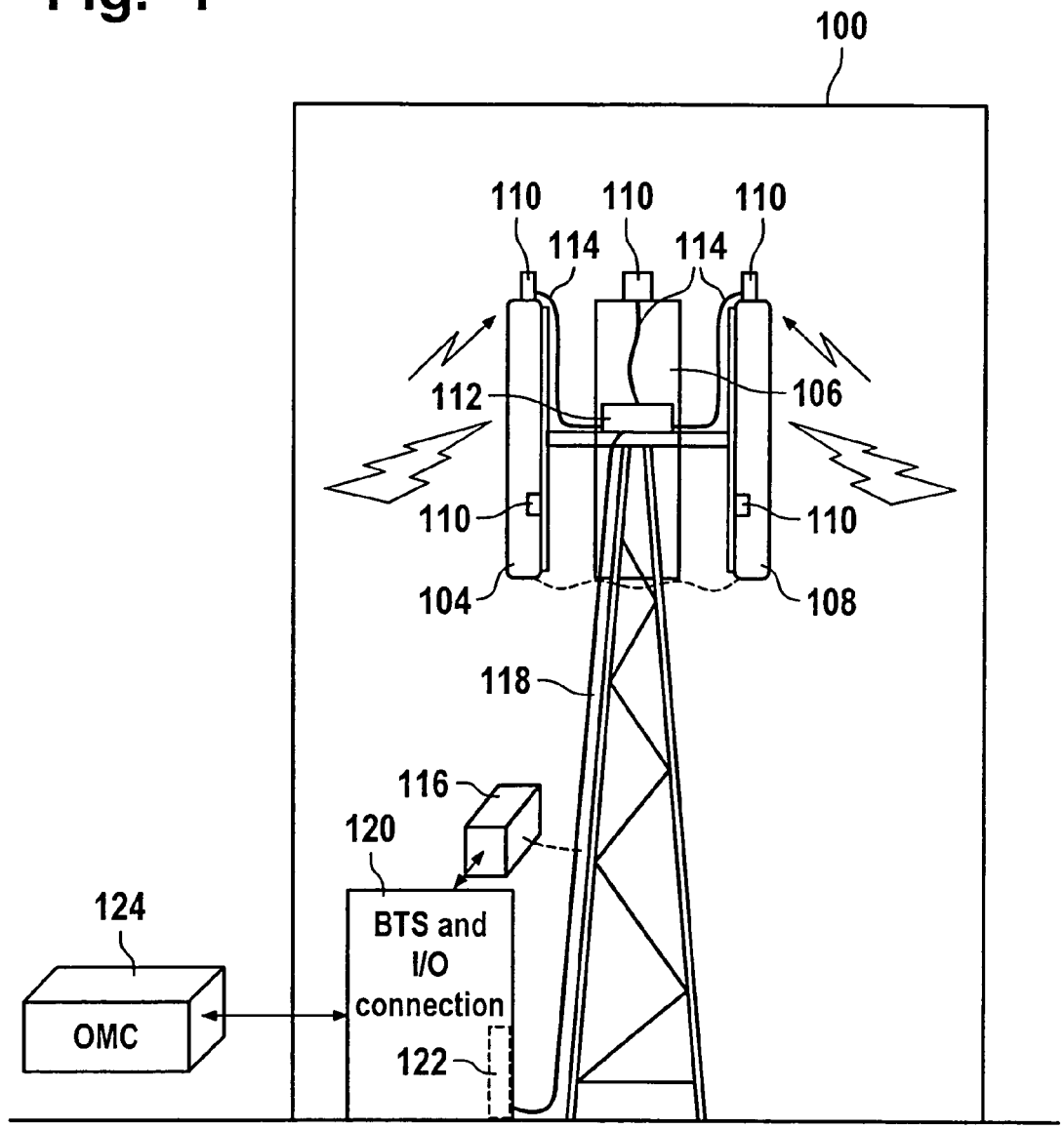
FIG. 1 shows a fixed transmitting station being coupled to an operations and maintenance centre.

FIG. 1 shows a fixed transmitting station 100 having an antenna mast carrying antennas 104, 106 and 108. Probes 110 are mounted atop antennas 104, 106 and 108 and/or on the rear panels of antennas 104, 106 and 108 and/or near to or on the shelter of the base station 120 and/or at any place in the vicinity of the main lobe of antennas 104, 106 and 108. The probes 110 are coupled to a measurement device 112 by means of cables 114. In one embodiment, the probe 110, cables 114 and the measurement device 112 are integrated in a measurement equipment.

Measurement device 112 is coupled to interface unit 116 by means of cable 118. Interface unit 116 provides an interface between the measurement device 112 and base station 120. Alternatively base station 120 has an integrated interface module 122 in order to directly connect the cable 118 to the base station 120, i.e. to interface module 122 of base station 120.

Base station 120 is coupled to operations and maintenance centre 124. Base station 120 collects a variety of telecommunication parameters, such as the actual telecommunication traffic in the cell which is serviced by fixed transmitting station 100 and provides those parameters to operations and maintenance centre 124. On the basis of these parameters, radio link parameters of the fixed transmitting station 100 can be adapted by the operations and maintenance centre 124.

By means of the probes 110 electromagnetic field measurements are performed for measuring of the electromagnetic environment of the antennas 104, 106 and 108. The corresponding measurement signals which are provided by the probes 110 are transmitted via cables 114 to measurement device 112. Measurement device 112 transforms the measurement signals provided by the probes 110 into measurement data signals being indicative of the measured field strength. These measurement data are provided either indirectly via interface unit 116 or directly via interface module 122 to the base station 120.

In one embodiment, base station 120 forwards the measurement data to operations and maintenance centre 124. In this instance the data monitoring and processing is performed in the operations and maintenance centre. Alternatively some or all of the processing is performed locally by the base station 120 itself and only the results of the data processing are transmitted to the operations and maintenance centre 124.

The data monitoring and processing functionality which is implemented in the base station 120 and/or in the operations and maintenance centre 124 provides data related to electromagnetic field levels and/or to any drift of EME parameters in the vicinity of the fixed transmitting station 100. By means of the data processing potential problems are detected. Further appropriate warning and/or alert messages are generated on this basis and monitored, at the level or the operations and maintenance centre 124 and /or at the level of the base station 120.

In addition the radio link parameters of the fixed transmitting station 100 can be controlled on the basis of the electromagnetic field measurements. For example, if a drift of the EME parameters is detected the operations and maintenance centre 124 can adapt the radio link parameters of the fixed transmitting station 100 correspondingly in order to ensure that all regulatory norms are met at all times. It is to be noted that the probe 110 and the measurement device 112 can be integrated into antenna 104, 106 and 108.

Figure 2:
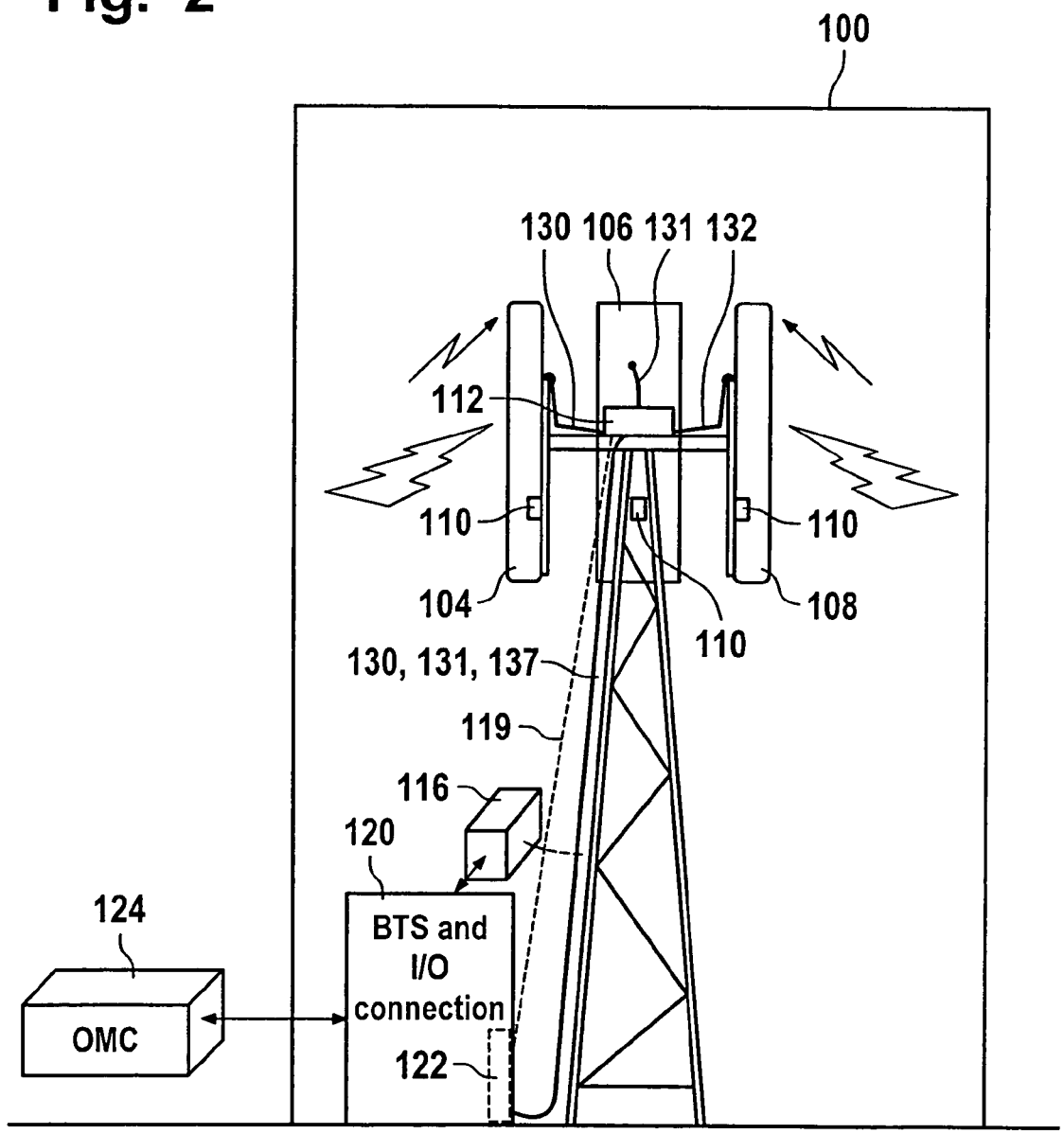
FIG. 2 shows an alternative embodiment of the fixed transmitting station of FIG. 2.

FIG. 2 shows an alternative embodiment of fixed transmitting station 100. Elements of FIG. 2 corresponding to elements of FIG. 1 are designated with the same reference numerals.

In the embodiment of FIG. 2 the antennas 104, 106 and 108 are coupled to base station 120 by means of radio frequency cables 130, 131 and 132, respectively. Radio frequency cable 130 serves for transmitting of radio frequency up-link and down-link signals between antenna 104 and base station 120. Likewise radio frequency cable 131 serves for transmission of such up-link and down-link signals between antenna 106 and base station 120 and radio frequency cable 132 serves for transmission of such signals between antenna 108 and base station 120.

In the example considered here the measurement probes 110 are integrated into the antennas 104, 106 and 108. The radio frequency cables 130, 131 and 132 have an additional functionality which is to interconnect the probes 110 to measurement device 112 and to interconnect measurement device 112 to interface module 122 or interface unit 116. This way a separate cable 118 between the measurement device 112 and interface module 122 or interface unit 116 can be replaced. This has the advantage of minimizing site commissioning and therefore reduces the cost and time required to set up a site. Additional electronics can be provided at both ends of radio frequency cables 130, 131 and 132 for coupling and de-coupling with radio frequency signals.

Alternatively one of the radio frequency cables 131, 131 or 132 is used to provide a power supply to measurement device 112 in addition to the transmission of the radio frequency up-link and down-link signals between the antennas and the base station 120. In this instance probes 110 are coupled to measurement device 112 by separate cables. The transmission of the measurement data from the measurement device 112 to the interface module 122 is performed by means of a wireless link 119 between the measurement device 112 and base station 120.

It is to be noted that in all of the embodiments considered above the measurement probes 110 can be either mounted on or integrated in the antenna means and/or mounted on/or near the base station shelter and/or installed at any place in the vicinity of the main lobe of antennas 104, 106 and 108.

Figure 3:
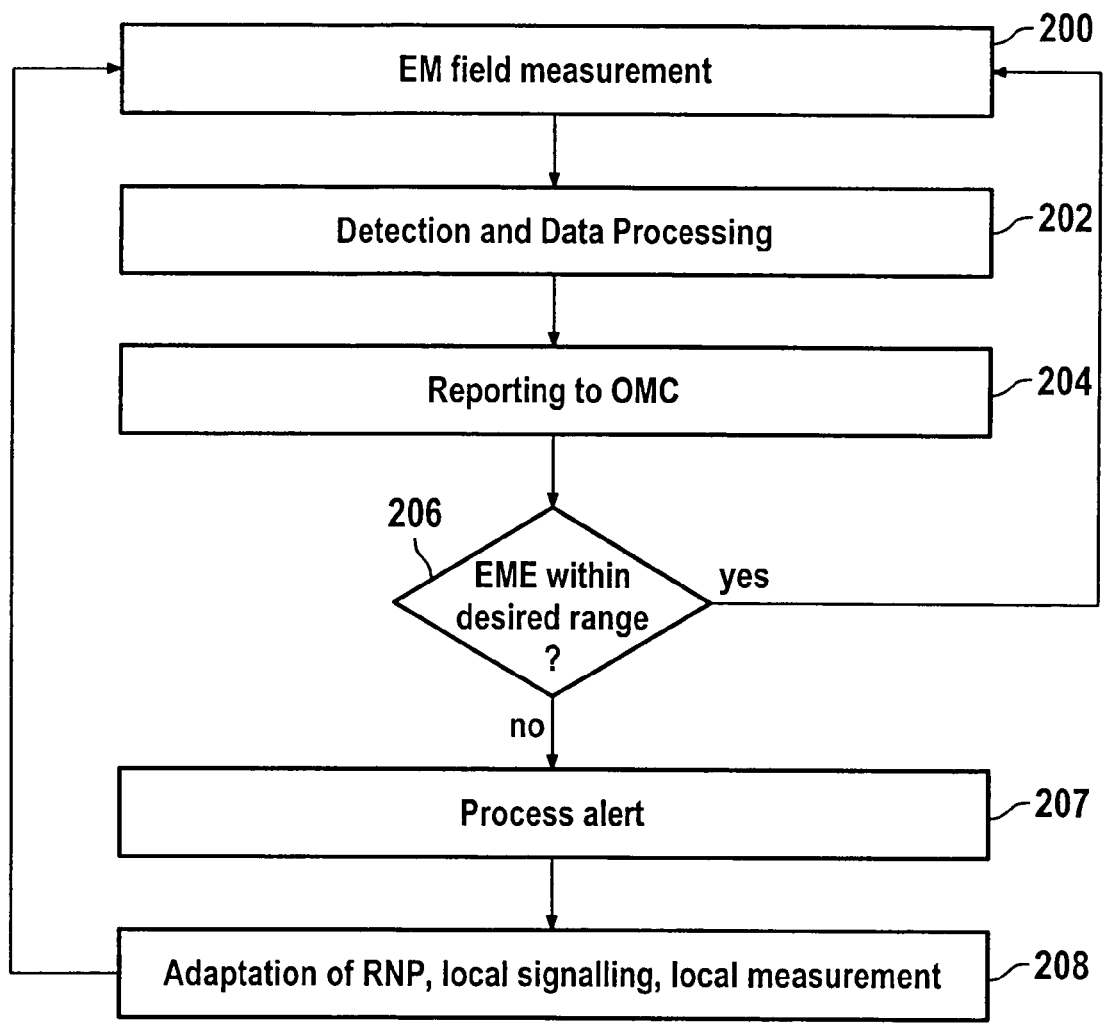
FIG. 3 is a flow chart being illustrative of a method of the invention.

FIG. 3 shows a corresponding flow chart. In step 200 ongoing electromagnetic field measurements are performed in order to monitor electromagnetic environment of the antenna of a fixed transmitting station. The corresponding measurement signals are converted in step 202 into measurement data being representative of the measured electromagnetic field parameters. As an option, data processing is performed in step 202 in order to pre-process the data before it is reported to an operations and maintenance centre in step 204. In step 206 an assessment is made by the operations and maintenance centre whether the measured electromagnetic field parameters are within a desired range. If this is the case no further action needs to be taken and further measurement results are evaluated at periodic intervals by repeating steps 200 to 206.

If the electromagnetic field parameters are not within the desired range, an alert signal is generated and processed. In step 207 the alert is processed. Depending on the alert level, the radio network parameters may be adapted or other actions, for example local signalling or more accurate in-situ measurements, can be performed correspondingly in step 208.

The integration of the electromagnetic field measurements into the fixed transmitting station is advantageous both for setting up the fixed transmitting station and for its operation. When the fixed transmitting station is installed the electromagnetic environment is assessed locally. Then, during operation this procedure enables real-time monitoring of the electromagnetic environment and any drifts or changes which may occur. This ongoing site monitoring is especially useful in the case of site sharing.

This feature is especially useful when an additional telecommunication system is set up and site-sharing is used. For example if the fixed transmitting station belongs to a GSM system and an additional node-B of a UMTS system is installed next to the existing base station this may abruptly change the electromagnetic environment which is immediately reported back to the operations and maintenance centre. In response any required adaptations can be performed.

LIST OF REFERENCE NUMERALS

100 fixed transmitting station
102 antenna mast
104 antenna
106 antenna
108 antenna
110 probe
112 measurement device
114 cable
115 measurement equipment
116 interface unit
118 cable
119 wireless link
120 base station
122 interface module
124 operations and maintenance centre
130 radio frequency cable
131 radio frequency cable
132 radio frequency cable

The invention claimed is:

1. A fixed transmitting station of a wireless telecommunication system comprising:
    an antenna connected to said fixed transmitting station;
    measurement means for in-situ electromagnetic field measurements of an electromagnetic environment of the antenna at the fixed transmitting station, the electromagnetic field measurements being made by a fixed measurement probe mounted on said antenna,
    means for transmitting of data being indicative of a measurement result from the measurement means to a central control unit;
    a data processor that processes said data, and assesses at least one of electromagnetic field levels and a drift of electromagnetic parameters related to said electromagnetic environment; and
    a measurement device, coupled to said fixed measurement probe, that transmits signals to said measurement device and to a central control unit comprising an operation and maintenance center such that said data can be centrally monitored,
    wherein radio link parameters of the fixed transmitting station are controlled based on said electromagnetic field measurement.

2. The fixed transmitting station of claim 1, the measurement means being mounted on the antenna, the antenna being coupled to at least one cable for one of (a) transmitting of radio frequency up-link and down-link signals and the at least one cable being connected to the measurement means in order to couple the measurement means to a power supply, and (b) for transmitting of the data being indicative of a measurement result.

3. The fixed transmitting station of claim 2, wherein said cable comprises a radio frequency (RF) cable.

4. The fixed transmitting station of claim 1, the data processing means being adapted to generate one of a report and an alert message for the central control unit.

5. The fixed transmitting station of claim 1, further comprising means for controlling of at least one network parameter of the wireless telecommunication system based on the data.

6. The fixed transmitting station of claim 1, wherein manual interaction is not required for said measurement.

7. The fixed transmitting station of claim 1, wherein the electromagnetic field measurement at said fixed transmitting station depends on electromagnetic fields of the antenna and an electromagnetic environment of the antenna.

8. The fixed transmitting station of claim 1, wherein a change in an electromagnetic environment of the fixed transmitting station, due to an addition of another fixed transmitting station, is immediately reported to said central control unit.

9. A method of monitoring a fixed transmitting station of a wireless telecommunication system, the method comprising the steps of:
    at a fixed location on the fixed transmitting station, measuring of an electromagnetic field of an electromagnetic environment of an antenna of the fixed transmitting station by a fixed measurement probe mounted on said antenna,
    transmitting of data being indicative of a measurement result of the measurement to a central control unit comprising an operation and maintenance center,
    processing said data in a data processor,
    assessing, via said data processor, at least one of electromagnetic field levels and a drift of electromagnetic parameters related to said electromagnetic environment,
    transmitting, via a measurement device coupled to said fixed measurement probe, signals to said measurement device and to the central control unit, such that said data can be centrally monitored, and
    controlling radio link parameters of the fixed transmitting station based on said electromagnetic field measurement.

10. The method of claim 9 further comprising controlling of at least one network parameter of the wireless telecommunication system based on the data.

11. The method of claim 9, wherein said manual interaction is not required for said measuring.

12. The method of claim 9, wherein the electromagnetic field measurement at said fixed transmitting station depends on electromagnetic fields of the antenna and an electromagnetic environment of the antenna.

13. The method of claim 9, further comprising immediately reporting to said central control unit a change in the electromagnetic environment of the fixed transmitting station, due to an addition of another fixed transmitting station.

14. A computer readable medium having a stored computer program comprising said program means for performing the steps of:
  measuring an electromagnetic field measurement by a fixed measurement probe mounted on an antenna,
  inputting of data being indicative of a measurement result of the electromagnetic field measurement of an electromagnetic environment of the antenna of a fixed transmitting station of a wireless telecommunication system, said electromagnetic field measurement being performed at a fixed location of said fixed transmitting station, and
  processing of the data in a data processor for the purpose of at least one of data monitoring and controlling of at least one network parameter of the wireless telecommunication system,
  assessing, via said data processor, at least one of electromagnetic field levels and a drift of electromagnetic parameters related to said electromagnetic environment,
  transmitting, via a measurement device coupled to said fixed measurement probe, signals to said measurement device and to a central control unit comprising an operation and maintenance center, such that said data can be centrally monitored, and
  controlling radio link parameters of the fixed transmitting station based on said electromagnetic field measurement.

15. The computer readable medium of claim 14, wherein manual interaction is not required for obtaining said measurement.

16. The computer readable medium of claim 14, wherein the electromagnetic field measurement at said fixed transmitting station depends on electromagnetic fields of the antenna and an electromagnetic environment of the antenna.

17. The computer readable medium of claim 14, wherein a change in the electromagnetic environment of the fixed transmitting station, due to an addition of another fixed transmitting station, is immediately reported to a central control unit.

* * * * *